(12) United States Patent
Friberg et al.

(10) Patent No.: US 12,299,958 B2
(45) Date of Patent: May 13, 2025

(54) ANGLE-AWARE OBJECT CLASSIFICATION

(71) Applicant: ICEYE OY, Espoo (FI)

(72) Inventors: Tapio Friberg, Espoo (FI); Pekka Laurila, Espoo (FI); Shay Strong, Espoo (FI)

(73) Assignee: ICEYE OY, Espoo (FI)

( * ) Notice: Subject to any disclaimer, the term of this patent is extended or adjusted under 35 U.S.C. 154(b) by 0 days.

(21) Appl. No.: 18/716,312

(22) PCT Filed: Nov. 30, 2022

(86) PCT No.: PCT/EP2022/083868
§ 371 (c)(1),
(2) Date: Jun. 4, 2024

(87) PCT Pub. No.: WO2023/110404
PCT Pub. Date: Jun. 22, 2023

(65) Prior Publication Data
US 2024/0428562 A1  Dec. 26, 2024

(30) Foreign Application Priority Data

Dec. 17, 2021 (GB) .................................. 2118441

(51) Int. Cl.
*G06V 10/764* (2022.01)
*G06V 10/774* (2022.01)
*G06V 10/82* (2022.01)
*G06V 20/13* (2022.01)

(52) U.S. Cl.
CPC .......... *G06V 10/764* (2022.01); *G06V 10/774* (2022.01); *G06V 10/82* (2022.01); *G06V 20/13* (2022.01)

(58) Field of Classification Search
CPC ............... G01S 13/9021; G01S 13/904; G01S 13/9041; G01S 13/9054; G01S 7/412
See application file for complete search history.

(56) References Cited

U.S. PATENT DOCUMENTS

| 2020/0033615 A1* | 1/2020 | Kim ...................... G02B 30/40 |
| 2020/0134858 A1* | 4/2020 | Yang ..................... G06T 7/0004 |
| 2023/0138380 A1* | 5/2023 | Chen .................. G06F 18/2148 |
| | | 382/131 |

OTHER PUBLICATIONS

PCT Written Opinion and Search Report issued in related PCT/EP2022/083868 dated Feb. 20, 2024.
Juyoung Song, et al., "Automated Procurement of Training Data for Machine Learning Algorithm on Ship Detection Using AIS Information", Remote Sensing, 2020 vol. 12, 1443, 20 pages.

(Continued)

*Primary Examiner* — Manuchehr Rahmjoo
(74) *Attorney, Agent, or Firm* — Cozen O'Connor

(57) ABSTRACT

A computer-implemented method of classifying objects in an image, the method comprising: receiving image data associated with the image; receiving incidence angle data, wherein the incidence angle data is indicative of an incidence angle from which the image data is collected by a detector; and using a machine learning model to classify one or more objects within the image as belonging to one of one or more categories, wherein classifying the one or more objects within the image is based on: the incidence angle data, and respective values of one or more parameters of the image data.

21 Claims, 10 Drawing Sheets

(56) References Cited

OTHER PUBLICATIONS

Khaleghian Salman et al., "Sea Ice Classification of SAR Imagery Based on Convolution Neural Networks", Remote Sensings, vol. 13, No. 9, Apr. 29, 2021 p. 1734, 20 pages.
Yan Xu, et al., "Sea Ice and Open water Classification of SAR Imagery Using CNN-Based Transfer Learning", IEEE International Geoscience and Remote Sensing Systmes (IGARSS) 2017, pp. 3262-3265. 978-1-5090-4951-6/17/2017 IEEE.
Great Britain Office Action issued in connection with related Great Britain patent application No. GB2118441.1 dated May 5, 2022.
Great Britain Office Action issued in connection with related Great Britain patent application No. GB2118441.1 dated Oct. 3, 2023.
Japanese Office Action issued in connection with related Japanese Patent Application No. 2024-536031 dated Nov. 6, 2024.
Adel, Ammar, et al., "Sea Surface Salinity Retrieval for the SMOS Mission Using Neural Networks,", IEEE Transactions on Geoscience and Remote Sensing, vol. 46, No. 3 dated Mar. 2008, pp. 754-764.
Lang, Wenhui, et al., "Incidence Angle Correction of SAR Sea Ice Data Based on Locally Linear Mapping", IEEE Transactions on Geoscience and Remote Sensing, vol. 54, No. 6, dated Jun. 6, 2016, pp. 3188-3911.
Karvoene, Juha, et al., Baltic Sea Ice Concentration Estimation Based on C-Band Dual-Polarized SAR Data, IEEE Tranctions on Geoscience and Remote Sensing, vol. 52, No. 9, dated Sep. 9, 2014, pp. 5558-5566.
Canadian Office Action issued in related Canadian Patent Application No. 3,239,724 dated Dec. 11, 2024.

\* cited by examiner

ANGLE-AWARE OBJECT CLASSIFICATION

This application is the National Stage filing under 35 U.S.C. 371 of International Application No. PCT/EP2022/083868 filed on 30 Nov. 2022, which claims priority to GB Application No. 2118441.1 filed on 17 Dec. 2021, the contents of both of which are hereby incorporated by reference herein in their entirety to the extent permitted by law.

FIELD OF THE INVENTION

The present application relates to methods of object classification within images. In particular, the present invention relates to methods of object classification of objects within images based, at least in part, on the angle of incidence from which the associated image data is collected.

BACKGROUND TO THE INVENTION

In many imaging systems, the qualitative and quantitative nature of the collected imaging data can vary significantly based on the incidence angle from which the image data is collected. For examples, in active radar systems configured for remote sensing, the collected image data comprises a radar backscatter signal received at a detector. The intensity, phase, and other properties of a radar backscatter signal are strongly dependent on both the incidence angle from which the image data is collected and the optical properties of the target being imaged by the radar signal. Such optical properties may include reflectivity, transmissivity and other properties that may themselves have a strong dependence on the incidence angle.

In the context of satellite-based radar imaging, image data may be collected from a range of incidence angles. In such systems, two images of the same imaging subject may have significant quantitative and qualitative differences due to a difference in the incidence angles from which the respective image data associated with each of the images is collected. Such variations in the image data may lead to significant difficulties when attempting to analyse and/or compare the images accurately, for example when attempting to classify objects or areas within the images.

The inventors have devised the claimed invention in light of the above considerations.

The embodiments described below are not limited to implementations that solve any or all of the disadvantages of the known approaches described above.

SUMMARY OF INVENTION

This Summary is provided to introduce a selection of concepts in a simplified form that are further described below in the Detailed Description. This Summary is not intended to identify key features or essential features of the claimed subject matter; variants and alternative features that facilitate the working of the invention and/or serve to achieve a substantially similar technical effect should be considered as falling into the scope of the invention.

In a general sense, the present disclosure provides a method of classifying objects within images that accounts for the respective angle of incidence from which the image data associated with each image is collected.

The invention is defined as set out in the appended set of claims.

In a first aspect of the present invention, there is provided a computer-implemented method of classifying objects in an image, the method comprising: receiving image data associated with the image; receiving incidence angle data, wherein the incidence angle data is indicative of an incidence angle from which the image data is collected by a detector; and using a machine learning model to classify one or more objects within the image as belonging to one of one or more categories, wherein classifying the one or more objects within the image is based on: the incidence angle data; and respective values of one or more parameters of the image data.

In this way, the classification of an object according to this method may be sensitive to differences in the imaging data caused by variations in the angle of incidence from which the image data is collected.

In another aspect of the invention, there is provided a computer apparatus configured to carry out any of the methods disclosed herein.

In another aspect of the invention, there is provided a computer-readable medium comprising logic which, when executed by a computer, causes the computer to carry out any of the methods disclosed herein.

In another aspect of the invention, there is provided a computer program comprising instructions which, when executed by a computer causes the computer to carry out any of the methods disclosed herein.

The methods described herein may be performed by software in machine readable form on a tangible storage medium e.g., in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is issued for designing silicon chips, or for configuring universal programmable chips, to carry out desired functions.

The features and embodiments discussed above may be combined as appropriate, as would be apparent to a person skilled in the art, and may be combined with any of the aspects of the invention except where it is expressly provided that such a combination is not possible or the person skilled in the art would understand that such a combination is self-evidently not possible.

BRIEF DESCRIPTION OF THE DRAWINGS

Embodiments of the present invention are described below, by way of example, with reference to the following drawings.

Figure 1:
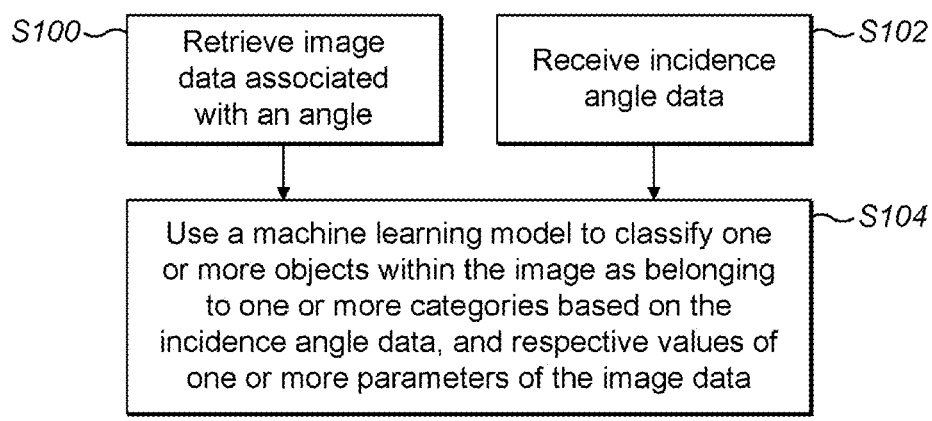
FIG. 1 is a flowchart showing a method of classifying objects in an image.

Common reference numerals are used throughout the figures to indicate the same or similar features.

DETAILED DESCRIPTION

Embodiments of the present invention are described below by way of example only. These examples represent the best mode of putting the invention into practice that are currently known to the Applicant although they are not the only ways in which this could be achieved, the description sets forth the functions of the example and the sequence of steps for constructing and operating the example. However, the same or equivalent functions and sequences may be accomplished by different examples.

FIG. 1 is a flowchart showing a method of classifying objects in an image.

In an operation S100, image data associated with an image is received.

In another operation S102, incidence angle data is received. The incidence angle data is indicative of an incidence angle from which the image data is collected by a detector.

In some embodiments, the incidence angle data may be received simultaneously with the image data. In other words, operations S100 and S102 may be carried out simultaneously.

In this way the accuracy of the incidence angle data may be increased to ensure that the incidence angle data is truly indicative of the angle of incidence at the time that the image data is collected by the detector.

Additionally or alternatively, the image data may comprise metadata, the metadata optionally comprising information such as the time and/or date at which the image data was collected, e.g. a timestamp associated with the image data. In such examples, receiving the incidence angle data may involve receiving incidence angle data based on the timestamp, or other metadata related to the time and/or date at which the image data was collected. In this way, analysis of the image may be delayed to a time convenient to a user of the methods disclosed herein. For example, a user may select an image to be processed from a stack of images collected by the detector. The user may then receive incidence angle data based on the metadata, e.g., the timestamp, associated with the image data, as opposed to incidence angle data associated with the time at which the user receives the previously stored image data. In such cases, operations S100 and S102 may be carried out at different times.

In some examples that involve satellite-based imaging, the metadata may comprise information such as a satellite identifier number, i.e., an identifier for which satellite amongst a plurality of satellites the detector that collected the image data was on-board. This information may be indicative of the hardware on-board the satellite. For example, by identifying the satellite, it may be possible to obtain information regarding the properties of the detector and/or the satellite itself. In some examples, this information may be directly included in the metadata.

In some embodiments, the incidence angle data may be derived from a local incidence angle model based on a geometric model of the Earth and one or more state vectors indicative of the position of the detector relative to the geometric model of the Earth.

In this way, the incidence angle data may be a sufficiently accurate approximation without needing to obtain difficult and expensive measurements of the precise incidence angle.

In some embodiments, the geometric model of the Earth may be an ellipsoidal model.

Alternatively, the geometric model of the Earth may be a spherical model, a "real Earth" model, or based on a Digital Elevation Model (DEM). Each model provides a different approach for determining the elevation of an object on the surface of the Earth, based on a different model of the shape of the surface of the Earth. In practical terms, each geometric model strikes a balance between the computational cost of determining the shape and elevation and the accuracy of the model. In other words, the higher the complexity of the model (e.g., a "real Earth" model), the more accurate its determination of the shape of the surface of the Earth, but the greater the computational cost of modelling the elevation and precise coordinates of an object. In contrast, lower-complexity models (e.g., a spherical model) are significantly quicker and cheaper to process but have a lower accuracy due to the simplified model of the shape of the Earth. In practice, the inventors have found that the ellipsoidal model provides a good balance by reducing the computational cost associated with processing based on the geometric model without sacrificing the accuracy of the processing beyond tolerable levels.

In another operation S104, a machine learning model is used to classify one or more objects within the image as belonging to one of one or more categories. Classifying the one or more objects within the image is based on the incidence angle data and respective values of one or more parameters of the image data.

In some embodiments, classifying the one or more objects within the image may comprise classifying each of a plurality of pixels of the image as belonging to one of one or more categories.

In this way, a high level of granular detail in the classification may be achieved, as each individual pixel can be classified according to the one or more categories, allowing classification at a resolution that matches the resolution of the image collected by the detector.

In some embodiments, classifying one or more objects within the image may comprise classifying one or more objects within a section of the image.

In this way, computing and processing resources can be optimised by restricting the classification of objects to only be carried out within a region of interest within the image. This section, or region of interest, of the image may be determined automatically by the machine learning model based on one or more parameters used to train the model or based on one or more parameters selected by a user of the method and input into the machine learning model. Additionally or alternatively, a user of the method may manually select the section, or region of interest, within which the classification is to be performed.

In some embodiments, the one or more parameters of the image data may include one or more of: intensity values for each of a plurality of pixels; colour channel values for each of a plurality of pixels; and/or phase information for each of a plurality of pixels.

For example, the intensity values for each of a plurality of pixels may be indicative of the strength of an imaging signal received at each pixel of the detector. The intensity values may correspond to a grayscale value indicative of signal strength, for example in an 8-bit format allowing grayscale values to range between 0 and 255, the 256-grayscale. Alternatively, the grayscale values may be encoded in a smaller format, for example a 4-bit format, allowing grayscale values to range between 0 and 15, or in a larger format, for example a 16-bit format, allowing for grayscale values to range between 0 and 65535. In general, if the grayscale values are encoded in an n-bit format, then the grayscale values can range between 0 and $2^{n-1}$.

Additionally or alternatively, the one or more parameters of the image data may include channel values for each of a plurality of pixels. In some examples, for example in the case of radar imaging, the channel values may be polarisation channels, with each channel configured to be sensitive to different radar signals according to their polarisation. In many radar imaging systems including, for example, satellite-based radar imaging systems, the imaging signal collected by the detector may have backscattered from one or more imaging objects. The strength of the backscattering signal may be dependent on many factors, including the incidence angle and the polarisation of the imaging signal. Additionally, the backscattered imaging signal may comprise components in one or more polarisations different to the polarisation of the incident imaging signal.

In such examples, the polarisation channels may include H-H channels, i.e. channels particularly sensitive to radar signals that were both transmitted and received in a 'horizontal' polarisation; V-V channels, i.e. channels particularly sensitive to radar signals that were both transmitted and received in a 'vertical' polarisation; H-V channels, i.e. channels particularly sensitive to radar signals that were transmitted in a 'horizontal' polarisation and received in a 'vertical' polarisation; and V-H channels, i.e., channels particularly sensitive to radar signals that were transmitted in a 'vertical' polarisation and received in a 'horizontal' polarisation. Additionally or alternatively, the polarisation channels may include channels particularly sensitive to radar signals transmitted and/or received in circular or elliptical polarisations, or any combination of linear, circular and elliptical polarisations.

Additionally, the intensity of the backscattering signal, in many cases, may be dependent on the wavelength of the imaging signal. In all practical applications, the imaging signal will have a bandwidth. In other words, the imaging signal will not be perfectly monochromatic but will rather comprise a signal having a range of wavelengths. In such instances, there may be variations in the signal received based on the wavelength of different components of the signal. Accordingly, in such examples, the channel values may encode information based on the variability of backscattering intensity on signal wavelength.

In another example, for example an optical system, the wavelength of the imaging signal may correspond to the colour of the signal. In such a case, the range of wavelengths corresponds to a range, or mix, of colours. In such instances, the channel values may be colour channel values for a plurality of pixels that encode information based on the variability of backscattering intensity on signal wavelength.

The colour channels may be categorised using any suitable channel scheme. For example, the colour channels may be based on an additive configuration such as RGB channels, HSL channels, or HSV channels (a.k.a., HSB channels). Additionally or alternatively, the colour channels may be based on a subtractive configuration such as CMYK channels. Additionally or alternatively, the colour channels may be based on luma and chrominance components such as YUV channels.

In some examples, the one or more parameters may include phase information for each of a plurality of pixels. Relative phase information between pixels may provide information indicative of the relative elevation or orientation of objects imaged in different pixels based on the phase difference between said pixels. The orientation of an object can greatly impact the intensity of the backscattering signal due to the orientation of a reflecting surface and therefore the relative phase information may be particularly relevant to the processing of images captured by fast-moving detectors, e.g., detectors on board satellites.

The phase values may be encoded separately to the intensity values described above. In other examples, the phase values and intensity values may be encoded together as complex data values, i.e., data encoded as a complex number having a real and imaginary part. The magnitude, or modulus, of each complex data value may then correspond to a respective intensity value, while the argument of each complex data value may correspond to a respective phase value.

In some embodiments, the detector may be on board a satellite in orbit around the Earth.

Figure 2:
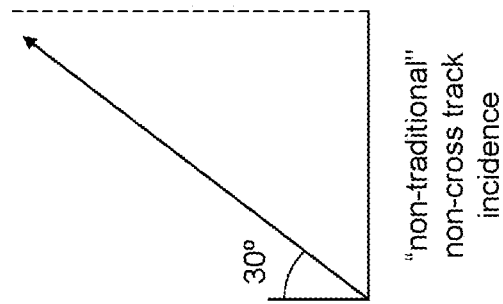
FIG. 2 depicts an example of a satellite capturing an image of an imaging object from different incidence angles.
Figure 2:
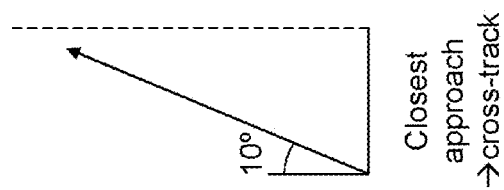
Figure 2:
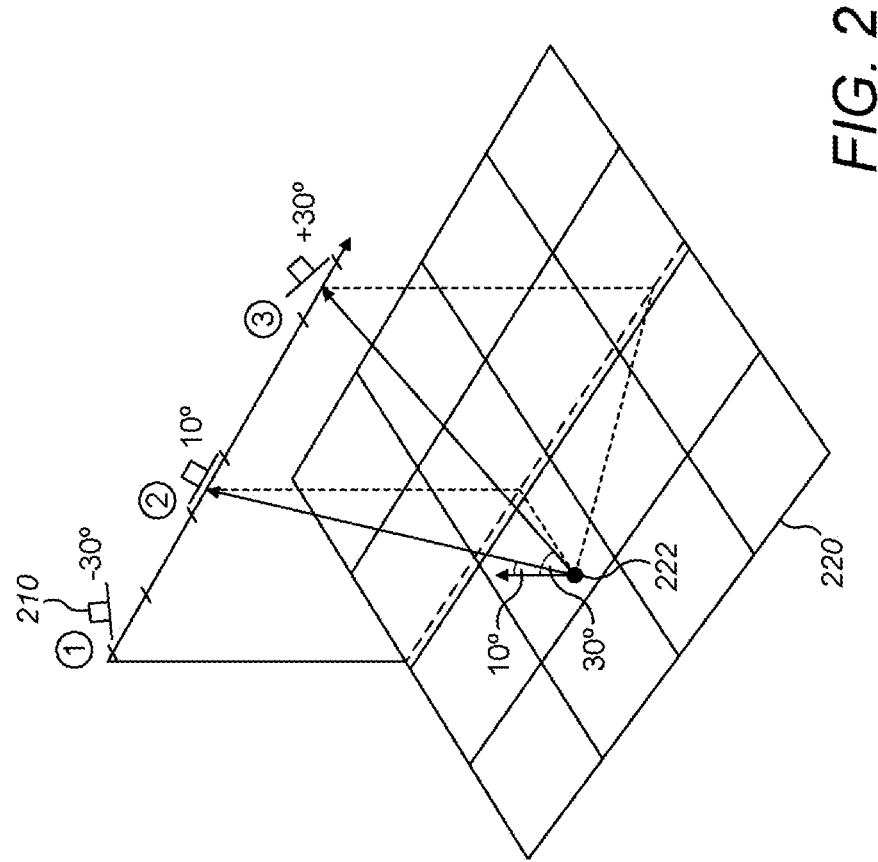

FIG. 2 depicts an example of a satellite 210 capturing an image of an imaging object 222 from different incidence angles.

As the satellite 210 orbits the Earth 220, the detector may be orientable to capture several images of the same imaging object 222. In some examples, the entire satellite 210 may rotate to orient the detector. Additionally or alternatively, the detector may be rotatable with respect to the platform on which it is carried, e.g. satellite or aircraft, to orient the detector. However, due to the motion of the satellite 210, the angle of incidence, θ, from which the detector collects the image data can vary. In some examples, the angle of incidence can vary greatly between successively captured images.

In the example depicted in FIG. 2, the angle of incidence varies as the satellite 210 collects image data from three exemplary points in its orbital trajectory around the Earth 220. For example, when the satellite is in a first position along its trajectory, the incidence angle for an imaging signal reflected from the imaging object 222 is a first incidence example. In the example shown in FIG. 2, the first incidence angle is approximately −30°. When the satellite is in a second position along its trajectory, the incidence angle for an imaging signal reflected from the imaging object 222 is a second incidence angle. In the example shown in FIG. 2, the second incidence angle is approximately 10°. When the satellite is in a third position along its trajectory the incidence angle for an imaging signal reflected from the imaging object 222 is a third incidence angle. In the example shown in FIG. 2, the third incidence angle is approximately +30°.

Additionally, while only one imaging object 222 is depicted in FIG. 2 for illustrative purposes, each image collected by the detector on-board the satellite 210 may collect image data associated with a plurality of imaging objects 222. There may be a complete or partial overlap between the imaging objects 222 imaged within each of the different images or there may be no overlap at all. In other words, each image collected by the detector on-board the satellite 210 may include image data associated with all the same imaging objects 222, or each image collected by the detector on-board the satellite 210 may include image data associated with some of the same imaging objects 222 and/or some different imaging objects 222, or each image collected by the detector on-board the satellite 210 may include image data associated with different imaging objects 222.

In some examples of satellite-based imaging, such as the example depicted in FIG. 2, the satellite 210 does not pass directly overhead the imaging object(s) 222. In other words, the detector may capture images offset from the track of the satellite's trajectory, i.e., the detector may not capture images of the area directly underneath (at the nadir) of the satellite 210. Additionally, as can be seen in FIG. 2, the angle of incidence may be a combination of a cross-track angle between the satellite 210 and the imaging object 222 (perpendicular to the direction of travel of the satellite) and the along-track angle between the satellite 210 and the imaging object 222.

In some examples, the orbital period of the satellite 210 may be 6 hours or less, 12 hours or less, 18 hours or less, 24 hours or less, 36 hours or less, 48 hours or less, or 72 hours or less.

In some embodiments, the one or more state vectors indicative of the position of the detector (upon which the incidence angle data is based, at least in part) may be based on a model of the orbital path of the satellite 210.

In this way, it may be possible to determine the incidence angle data without requiring precise GPS measurements of the position of the satellite 210 at the time the image data was collected by the detector. Instead, provided with sufficiently accurate initialisation coordinates, the future trajectory of the satellite can be modelled for the lifetime of the satellite's orbit. For example, if the radius of the semi-major axis of the satellite's 210 orbit around the Earth 220 is provided together with co-ordinates of the position of the satellite 210 and the velocity of the satellite 210 at a given time, it may be possible to determine a model of the trajectory of the orbit of the satellite 210. This model may be based, for example, on a Keplerian orbit model, or similar. Additionally, it may be possible to update (regularly and/or as needed) the model of the satellite trajectory, for example, in instances where the satellite 210 is subject to a manoeuvre that alters its orbital path.

In some embodiments, the image may be a synthetic-aperture radar image.

Synthetic-aperture radar (SAR) images are typically based on transmitting a radar imaging signal and subsequently detecting and recording back-scattering signals received at a detector that have been reflected and/or scattered from one or more imaging objects 222. The intensity of the back-scattering signal is dependent on the incidence angle, θ, from which the image data is collected. The back-scattering intensity may also be dependent on other factors such as the wavelength of the imaging signal, the reflectivity and transmissivity of each imaging object 222, and the orientation of each imaging object 222. Accounting for each of these factors may be important for accurately classifying the imaging objects according to one or more categories. As one of the dominant factors impacting the back-scattering signal's intensity, it is very important to account for the incidence angle to improve the accuracy of the classification.

In some embodiments, the one or more categories may include one or more geographical features.

In some embodiments, the one or more geographical features may include one or more of: water; ice; arable land; forested land; and/or man-made constructions.

In the context of satellite-based imaging, or airborne imaging, the detector may be capturing images of geographical environments. These images could be captured for environmental, academic, military, or other purposes. When these images are based on SAR-imaging techniques, the collected image data may be based on back-scattering signals reflected from the different geographical features within the geographical environment. The intensity of the back-scattering signals may be strongly dependent on the nature of the geographical feature from which the signal has been reflected.

Figure 3A:
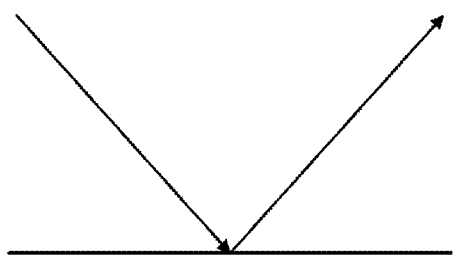
FIGS. 3a to 3d depict example scenarios of an imaging signal reflecting from the surface(s) of an imaging object.

FIG. 3a depicts a scenario of an imaging signal reflecting from the surface of a smooth imaging object.

When a radar signal reflects from a relatively smooth surface, the surface may act like a mirror and the signal may be specularly reflected away from the surface as can be seen in FIG. 3a. When specular reflection is strong, there will be minimal backscattering and so the intensity of the back-scattered signal collected by the imaging detector will be very low.

Figure 3B:
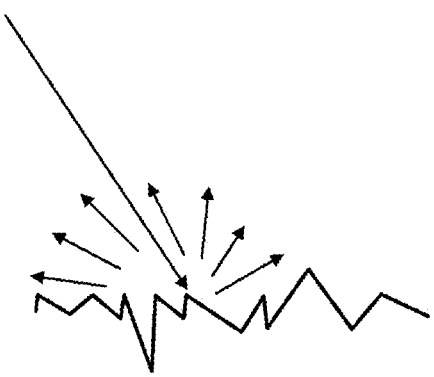

FIG. 3b depicts a scenario of an imaging signal reflecting from the surface of a rough imaging object.

In contrast to smooth-surface specular reflection, when a radar signal reflects from a relatively rough surface, the surface will cause the signal to be reflected diffusively away from the surface. When a signal is reflected diffusively, the signal will be reflected in all directions, as can be seen in FIG. 3b. This reflection may be approximately isotropic, or it may be relatively anisotropic. For example, a surface that is an intermediate between "rough" and "smooth" may reflect the radar signal in a generally specular fashion but with diffusive elements. In this way, the angular spectrum of the reflected signal may resemble a cone whose central axis lies along the line of specular reflection. The half-angle of this cone will increase with the roughness of the reflecting surface.

Figure 3C:
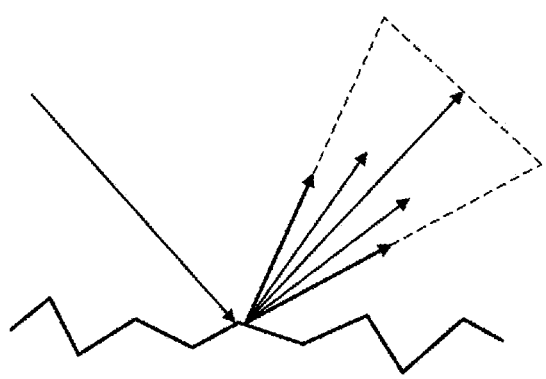

FIG. 3c depicts a scenario of an imaging signal reflecting from the surface of an imaging object whose surface roughness is an intermediate of "rough" and "smooth", as discussed above.

In the context of radar reflection, the terms "smooth" and "rough" refer to the surface smoothness and surface roughness of the surface. The smoothness or roughness of a surface may be quantified, for example, in terms of the Rayleigh criterion. For example, the surface roughness, d of a surface may be determined as the root-mean-square roughness height from a reference plane, i.e., the root-mean-square deviation of an objects surface from a plane defining the average position of the surface. A relatively rougher surface will have a higher value of surface roughness than a relatively smoother surface. For an imaging signal of wavelength, λ, incident on the surface with an incidence angle, θ, the surface may be considered to be smooth if:

$$d < \frac{\lambda}{\cos\theta}$$

Alternatively, the surface may be considered to be rough if:

$$d > \frac{\lambda}{\cos\theta}$$

Alternatively, the surface may be considered to be an intermediate between rough and smooth if:

$$d \approx \frac{\lambda}{\cos\theta}$$

Accordingly, it is clear that the relative smoothness or roughness of a surface depends not only on the properties of the surface, but also the wavelength of the imaging (radar) signal, and the angle of incidence.

For example, when the geographical feature is water, the degree of surface roughness depends on how relatively still the surface of the water is. For example, if the detector captures an image of relatively calm seas, the effective surface will be relatively smooth, thus resulting in the radar signal specularly reflecting from the surface of the water. As such, the back-scattered signal strength from calm water will be stronger at steep angles of incidence, i.e., when the detector is close to being directly overhead than at shallow angles of incidence, i.e., when the detector is closer to being in line with the horizon relative to the imaged surface. In contrast, when the detector captures an image of rougher seas, the effective surface will be rougher, thereby broadening the range of incidence angles at which a strong back-scattered signal will be captured.

Similarly, when the geographical feature is ice, the surface of the ice for radar imaging is smooth and so the radar will be specularly reflected.

In contrast, when the geographical feature is forested land, the roughness of the surface (caused by the tops of trees) will result in a reflected radar signal that is approximately isotropic due to the large degree of diffuse reflection. Accordingly, the strength of the back-scattered signal for forested land will have only a weak dependence on the incidence angle.

When the geographical feature is arable land, the roughness of the surface, caused by the presence of crops on otherwise flat land, may result in a reflected radar signal that is predominantly dominated by specular reflection but which comprises diffuse reflective elements broadening the angular spectrum of the reflected signal into a cone. In other words, arable land may represent a surface that is an intermediate between rough and smooth as discussed above, when the imaging signal is a radar signal.

Figure 3D:
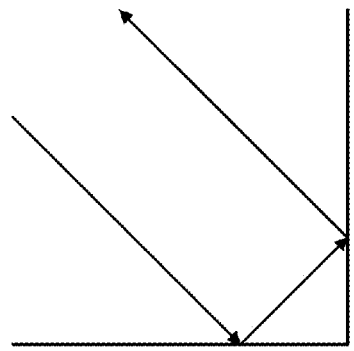

FIG. 3d depicts a scenario of an imaging signal undergoing corner reflection, for example from a man-made structure such as a building.

When the geographical feature is a man-made construction, a special case of specular reflection may occur. Man-made constructions are typically built with walls (or other vertical elements) perpendicular to the surface on which they are built. This means that an incident radar signal may undergo so-called corner reflection, wherein when a radar signal reflects from two smooth surface that are perpendicular to one another, the signal is reflected twice (once off each surface) and reflected back towards the detector. In such a case, the intensity of the reflected radar signal collected at the detector will be very high-higher than the diffusely reflected signal collected from the back-scattered signal from a rough surface.

A machine learning model can be trained to develop an understanding of the relationship between object features (such as surface roughness) and incidence angle and how that relationship affects the signal received by the detector. In this way, the machine learning model can be trained to more accurately classify imaging objects 222 based on the incidence angle data indicative of the incidence angle, and respective values of one or more parameters of the image data—for example the signal intensity collected for each pixel of the image, as discussed above.

In some examples, it may be necessary to capture an image of the imaging object 222 from multiple different incidence angles to be able to more accurately classify the imaging object 222. For example, more accurate classification may be achievable if an image of the imaging object 222 is available viewed from each of a relatively shallow angle, a relatively steep angle, and an intermediate angle between the shallow and steep angles. The strength of the signal intensity across the range of incidence angles may then enable a more accurate classification.

Purely for illustrative purposes, an example of a look-up table for classification of "rough" water, "calm" water, ice, arable land, forested land, and man-made constructions is included below for a "shallow" incidence angle, a "steep" incidence angle, and a "mid" incidence angle being an angle between the shallow and steep incidence angles. It is noted that the below table is qualitative and included for illustrative purposes of some of the logic that the machine learning model may learn during its training:

TABLE 1

Illustrative look-up table of logic for the relationship between signal intensity and incidence angle for a range of geographical features.

| | Shallow incidence Angle | Mid-range incidence angle | Steep incidence angle |
|---|---|---|---|
| Rough Water | Low-Mid signal intensity | Low-Mid signal intensity | Low-Mid signal intensity |
| Calm Water | Very Low signal intensity | Low signal intensity | High signal intensity |
| Ice | Very Low signal intensity | Low signal intensity | High signal intensity |
| Arable Land | Low signal intensity | Low-Mid signal intensity | Mid-High signal intensity |
| Forested Land | Low-Mid signal intensity | Low-Mid signal intensity | Low-Mid signal intensity |
| Man-made Construction | Very High signal intensity | Very High signal intensity | Very High signal intensity |

As can be seen from Table 1 above, some graphical features may exhibit very similar relationships between the signal intensity collected by the image detector and the incidence angle. In such cases, the machine learning model may be further trained based on metadata, for example GPS coordinates of the imaging object(s) 222 that provides the machine learning model with contextual information to enable it to distinguish between, for example, rough water and forested land or calm water and ice.

Figure 4:
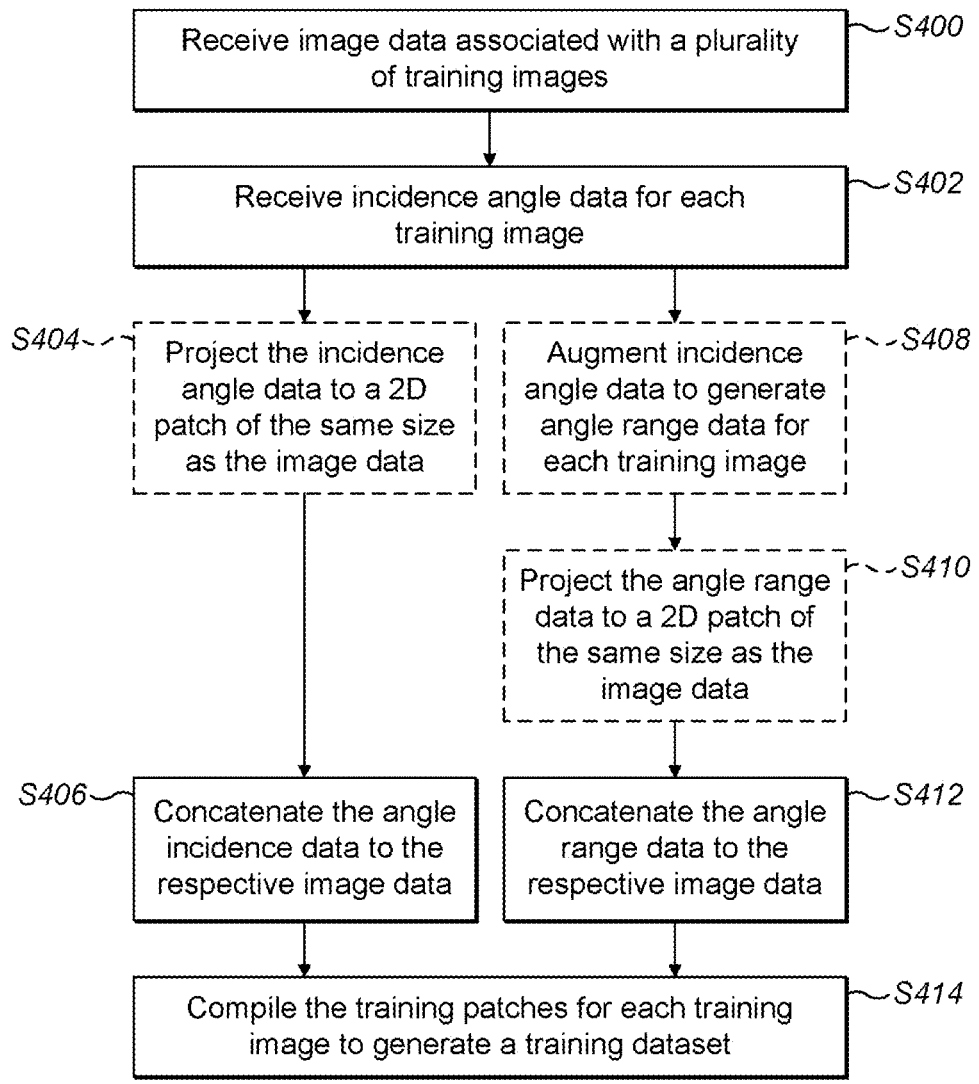
FIG. 4 is a flowchart showing a method of training a CNN to classify one or more objects within an image based on incidence angle data and one or more parameters of the image data.

FIG. 4 shows a method of training a CNN to classify one or more objects within an image based on incidence angle data and one or more parameters of the image data.

In an operation S400, the machine learning model receives image data associated with a plurality of training images.

In another operation S402, the machine learning model receives incidence angle data for each training image. The incidence angle data may be based on the same incidence angle model as that described above in relation to the incidence angle data received in the method shown in FIG. 1.

In further operations S404 to S412, a training data patch is generated for each received training image. As shown in operation S406, generating the training patch for a given training image may comprise concatenating the incidence angle data associated with the given training image to the image data associated with the given training image.

In other words, in some embodiments, the machine learning model may be trained to classify objects by: receiving image data associated with a plurality of training images; for each training image, receiving incidence angle data indicative of an incidence angle from which the image data associated with each respective training image is collected by the detector; and for each training image, generating a training data patch, wherein generating a training data patch comprises: concatenating the associated incidence angle data to the associated image data.

In this way, the machine learning model can be made to learn how the quantitative and/or qualitative nature of the image data is linked with and related to the incidence angle data. In other words, instead of the machine learning model learning how to process each of these datasets independently, the model is constrained to learn how the two datasets are interlinked and vary with each other to produce a final overall image.

In another operation S408, the received incidence angle data, for each training image, is augmented to generate angle range data for each training image.

In another operation S412, for each training image, the associated angle range data is concatenated to the associated image data as part of generating the training data patch.

In other words, in some embodiments, generating a training data patch may further comprise: augmenting the associated incidence angle data to generate angle range data, wherein the angle range data is indicative of a range of angles that the machine learning model is trained to recognise as being similar to the incidence angle indicated by the incidence angle data; and concatenating the angle range data to the associated image data.

By augmenting the incidence angle data to angle range data, the training of the machine learning model can be made more robust. In particular, this augmentation can prevent the machine learning model from learning false positive conclusions. For example, if the training data comprised data where every image collected with an incidence angle of 21.79° was determined as being an image of water, the machine learning model could erroneously learn that every image taken in the future with an incidence angle of 21.79° was an image of water. By augmenting the incidence angle data to generate angle range data, the risk of the machine learning model learning such false positive conclusions is significantly mitigated, thereby making the trained machine learning model a more robust and reliable model.

In some examples, for each incidence angle value in the incidence angle data, augmenting the incidence angle data may involve generating a respective range of incidence angles distributed about the incidence angle value. In some examples, the range of incidence angles may be uniformly distributed either side of the incidence angle value. For example, the range may include angles 0.05 degrees or more either side of the incidence angle value, 0.1 degrees or more either side of the incidence angle value, 0.25 degrees or more either side of the incidence angle value, 0.5 degrees or more either side of the incidence angle value, or 1 degree or more either side of the incidence angle value.

In some examples, the range of incidence angels for each incidence angle value may not be uniformly distributed about the incidence angle value. In other words, the distribution defining the angles within the range may be non-uniform. In some examples, the distribution may be symmetric about the incidence angle value, for example the distribution may be a normal distribution. In other examples, the distribution may be asymmetric about the incidence angle value. For example, the distribution may be biased towards either angles larger than the incidence angle value or angles smaller than the incidence angle value.

In one particular example, the range of incidence angles may be distributed according to a normal distribution with a standard deviation of 0.25 degrees or less. In such an example, 95% of the angle values within the range of incidence angles will be within 0.5 degrees or less either side of the incidence angle value.

In another operation S404, for each training image, the associated incidence angle data is projected to a two-dimensional patch of the same size as the associated image data before the associated incidence angle data is concatenated to the associated image data.

Similarly, in another operation S410, for each training image, the associated angle range data is projected to a two-dimensional patch of the same size as the associated image data before the associated angle range data is concatenated to the associated image data.

In other words, in some embodiments, generating a training data patch may further comprise: before concatenating, projecting the associated incidence angle data and/or the angle range data to a two dimensional patch having the same size as the associated image data.

In this way, the incidence angle data, angle range data and image data can all be combined into a single training patch that can be passed to, for example, a convolutional neural network, wherein convolution operations performed by the CNN can train the machine learning model to recognise the relationships and interlinks between the three datasets.

Figure 5:
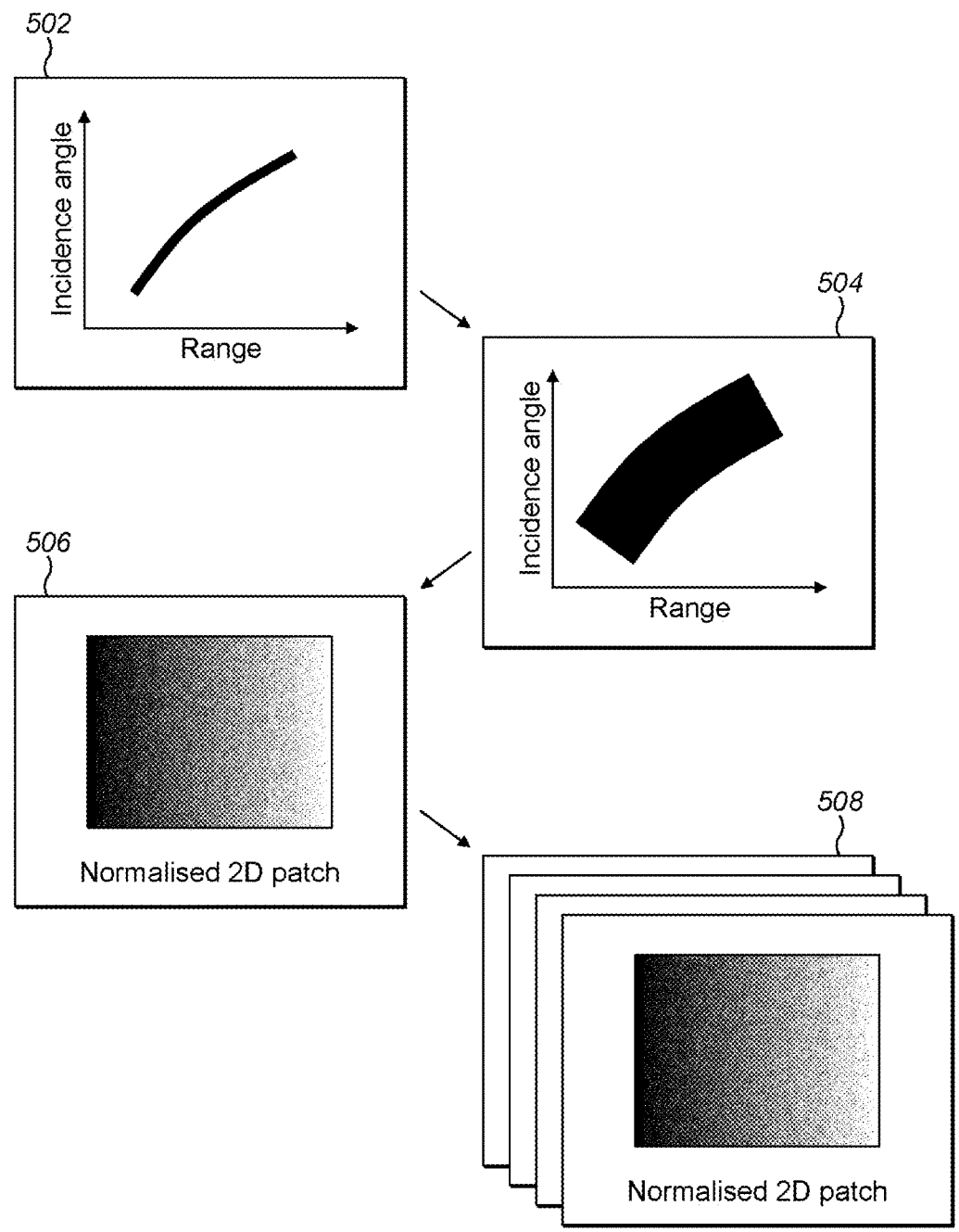
FIG. 5 depicts schematically how incidence angle data may be augmented to generate a training dataset to train the CNN of FIG. 3.

FIG. 5 depicts a schematic of how incidence angle data may be augmented to generate a training dataset to train the machine learning model.

In some embodiments, the local incidence angle model may comprise a function 502 defining a relationship between incidence angle and a distance in a first direction within the image.

In some examples, such as those where the detector is on-board a satellite 210, each image may be based in a coordinate system with two principal and mutually orthogonal, directions. For example, when the detector is on-board a satellite 210, the first direction along the image may correspond to the range direction of the satellite. In the context of satellite-based imaging, the range direction corresponds to a direction orthogonal to the motion of the satellite, i.e., the range direction is in the "cross-track" across the trajectory of the satellite. The second direction, orthogonal to the first, would then correspond to the azimuthal direction of the satellite. In the context of satellite-based imaging, the azimuthal direction is in the "along-track" direction parallel to the trajectory of the satellite.

By determining the incidence angle for each pixel of the image based only on the distance in a single direction within the image, the computational cost of determining the incidence angle may be significantly reduced.

In some embodiments, the function 502 may be a polynomial determined based on the geometric model of the Earth and a model of the trajectory of the detector.

In some embodiments, the polynomial may be a cubic polynomial.

In other examples, the polynomial may be a linear function, a quadratic, quartic, quintic or higher order polynomial. By defining the function as a polynomial, the computational cost of the determining the polynomial may be reduced relative to, for example, trigonometric functions. This is because polynomial functions typically require significantly fewer terms to compute than trigonometric, hyperbolic or exponential functions, or other functions which may require a quasi-infinite Taylor or Maclaurin expansion to determine (for example, it may be necessary to compute hundreds or even thousands of terms to accurately compute a trigonometric, hyperbolic or exponential function).

In practice, cubic functions may prove to be particularly suitable because they can be used to define relatively smooth functions with fewer 'kinks' than may be present in higher-order polynomials but with a finer control on gradient variations than is available in quadratic or linear functions.

The function 502 defining the relationship between the incidence angle and the number of pixels within the image in the range direction may be augmented to define a function 504 that defines a range of angles for the incidence angle at each pixel along the range direction within the image. The range of angles may be defined by a distribution function such that the "original" incidence angle is defined as being the most probable incidence angle, with the incidence angles at the edges of the range defined as being the least probable incidence angles. The distribution function may be symmetric—for example the distribution may be an approximately normal distribution. Alternatively, the distribution function may be asymmetric about the "original" incidence angle—for example the distribution may be approximately a beta distribution.

The augmented function 504 may be projected to a two-dimensional patch 506, as discussed above in relation to FIG. 4, that is of the same size as the image data associated with the respective training image. This two-dimensional patch 506 may then be concatenated with the associated image data to generate a training data patch.

The plurality of training data patches may then be compiled to form the training dataset 508 on which the machine learning model is trained.

In some embodiments, the machine learning model may be trained based, at least in part, on an elevation model of terrain imaged by the detector.

In this way, the machine learning model may be trained based on training data including information from the elevation model so that both the machine learning model and the user may gain an awareness of the overall scene geometry of the terrain imaged by the detector. This awareness may be further based on the classified objects, the incidence angle data and, in some examples, a determination of the overall orientation of one or more of the classified objects relative to the surface of the Earth and/or the detector.

In some embodiments, the machine learning model may comprise an artificial neural network.

In some embodiments, the artificial neural network may be a convolutional neural network.

Figure 6:
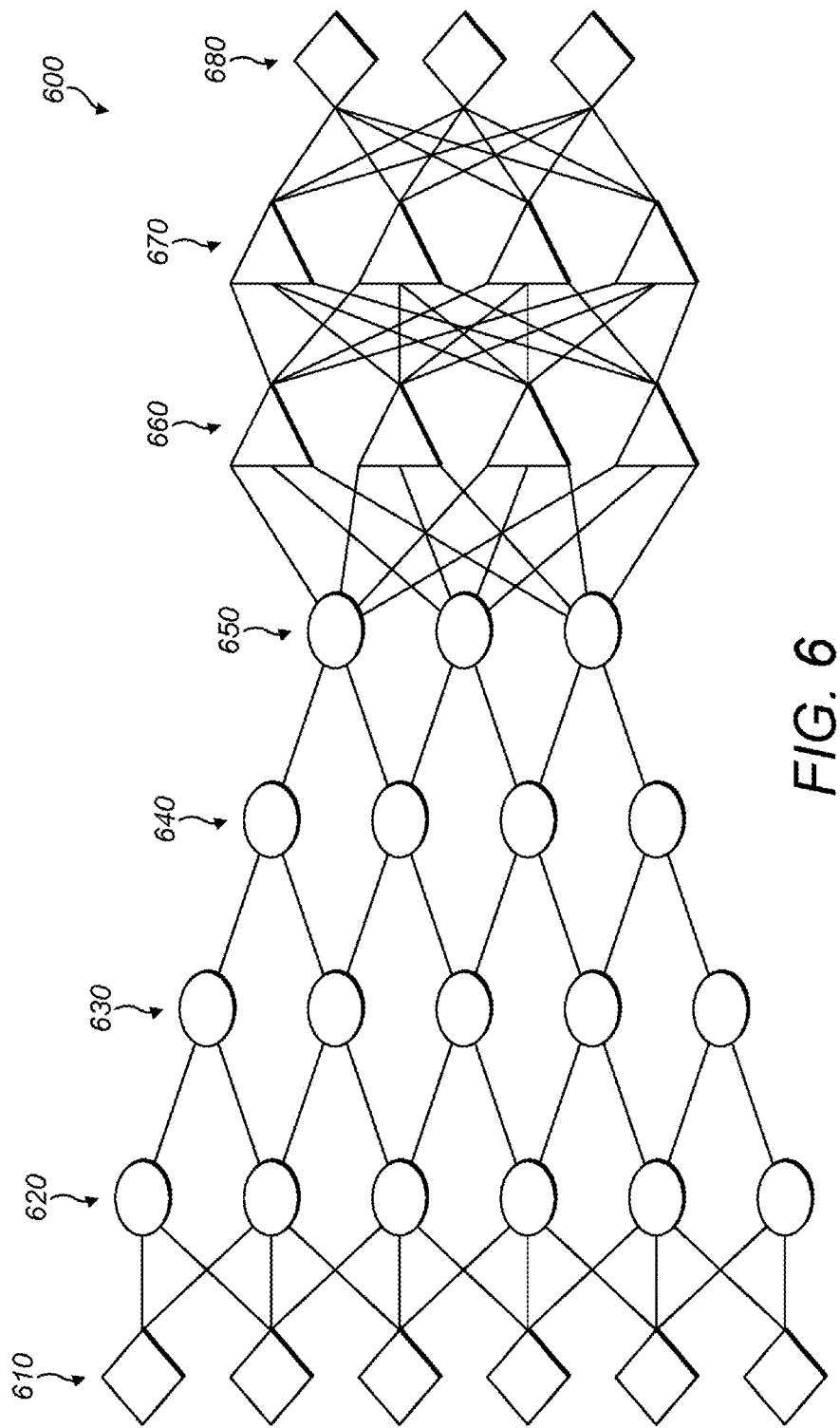
FIG. 6 shows a method of classifying objects in an image in accordance with the claimed invention.

FIG. 6 depicts a schematic of a Convolutional Neural Network (CNN) 600 that may be used to classify one or more objects within an image as belonging to one of one or more categories based on incidence angle data and one or more parameters of the image data.

A convolutional neural network (CNN) may be particularly useful in the context of the methods described herein due to its capability to analyse images by convolving neighbouring pixels to remove artefacts that may cause the CNN to learn incorrectly. In particular, and as may be the case for training the machine learning model described herein (as discussed below), CNNs are particularly suitable for systems where the data to be analysed, or the data the network is trained on involves data patches comprising a concatenation of various data types, due to its ability to convolve multiple datasets into a single factor (or reduced number of factors) for analysis and/or processing.

In the illustrative example depicted in FIG. 6, the CNN 600 may receive a plurality of input datasets 610—in this example 6. These input datasets are then fed into a set of nodes 620 according to the data links (shown as straight lines) shown in FIG. 6. The nodes 620 form the first layer of the CNN 600. In some examples, there may be the same number of nodes 620 as inputs 610. The first layer of nodes 620 convolve the received inputs 610 into a smaller number of nodes 630 that form the second layer of the CNN 600. In the example shown in FIG. 6, there are six nodes 620 in the first layer of the CNN 600 and five nodes 630 in the second layer of the CNN 600.

In some examples, there may be further convolving layers of the CNN 600. For example, in the example depicted in FIG. 6, the (five) nodes 630 in the second layer of the CNN 600 convolve the data into a smaller number (four) of nodes 640 that form the third layer of the CNN 600. These (four) nodes 640 in the third layer of the CNN 600 convolve the data into a yet smaller number (three) of nodes 650 that form a fourth layer of the CNN 600.

In some examples, once the data has been convolved to the desired number of nodes (in this case three), the convolved data is fed into further layers of the neural network that operate, for example, similarly to a feed-forward network. In the example depicted in FIG. 6, the convolved data is passed from the (three) nodes 650 in the fourth layer of the CNN into a set of (four) feed-forward nodes 660 that define a fifth layer of the CNN 600. In some examples, the (four) feed-forward nodes 660 in the fifth layer of the CNN 600 forward-propagate the data to at least one further set of (four) feed-forward nodes 670 in a sixth, or further, layer of the CNN 600. Finally, the data may be outputted to a plurality of output points 680 (in this example three) from the final (sixth) layer of (four) feed-forward nodes 670.

In an example, a CNN was developed to detect water in SAR images. The example CNN comprises a 2D convolutional input layer with two input channels that are fed through 64 filters and results in 64 output channels with a 3×3 kernel size. The CNN also comprises an activation layer that uses a Swish function to help the network learn to recognize water in complex images. Other functions such as a Rectified Linear Unit (ReLU) function could potentially also be used. In an example, the normalization layer makes use of Group Normalization using four groups. Other normalization methods such as Batch Normalization, Layer Normalization, and Instance Normalization could potentially also be used.

Using this CNN described above, an experiment was conducted to show an example of how the exact same model trained with the same set of images and incidence angles could better detect a feature such as water in a SAR image when also supplied with incidence angle data. The test was run on a semantic segmentation CNN autoencoder trained to segment out areas containing water. The model had approximately 40 million learnable parameters and was trained with focal loss, a type of weighted cross entropy. The training dataset consisted of 225,000 512×512 pixel patches taken from 543 SAR images obtained by X-band SAR satellites operated by ICEYE Oy of Espoo, Finland. The validation set consisted of 25,000 similar patches. The validation set was never shown to the model during training.

Two experiments were run to see how well the model could mimic the validation set by correctly detecting water in the right places. Water was chosen as a feature in this case because it can have a strong nonlinearity in SAR images when the SAR images are taken from low incidence angles. In both experiments the model was trained to segment out water with the same training set and with the same random seed. In one experiment, the model was then given the validation set of images but no incidence angle information. In a second experiment, the model was provided with both the validation image data and the associated incidence angle information.

Figure 7:
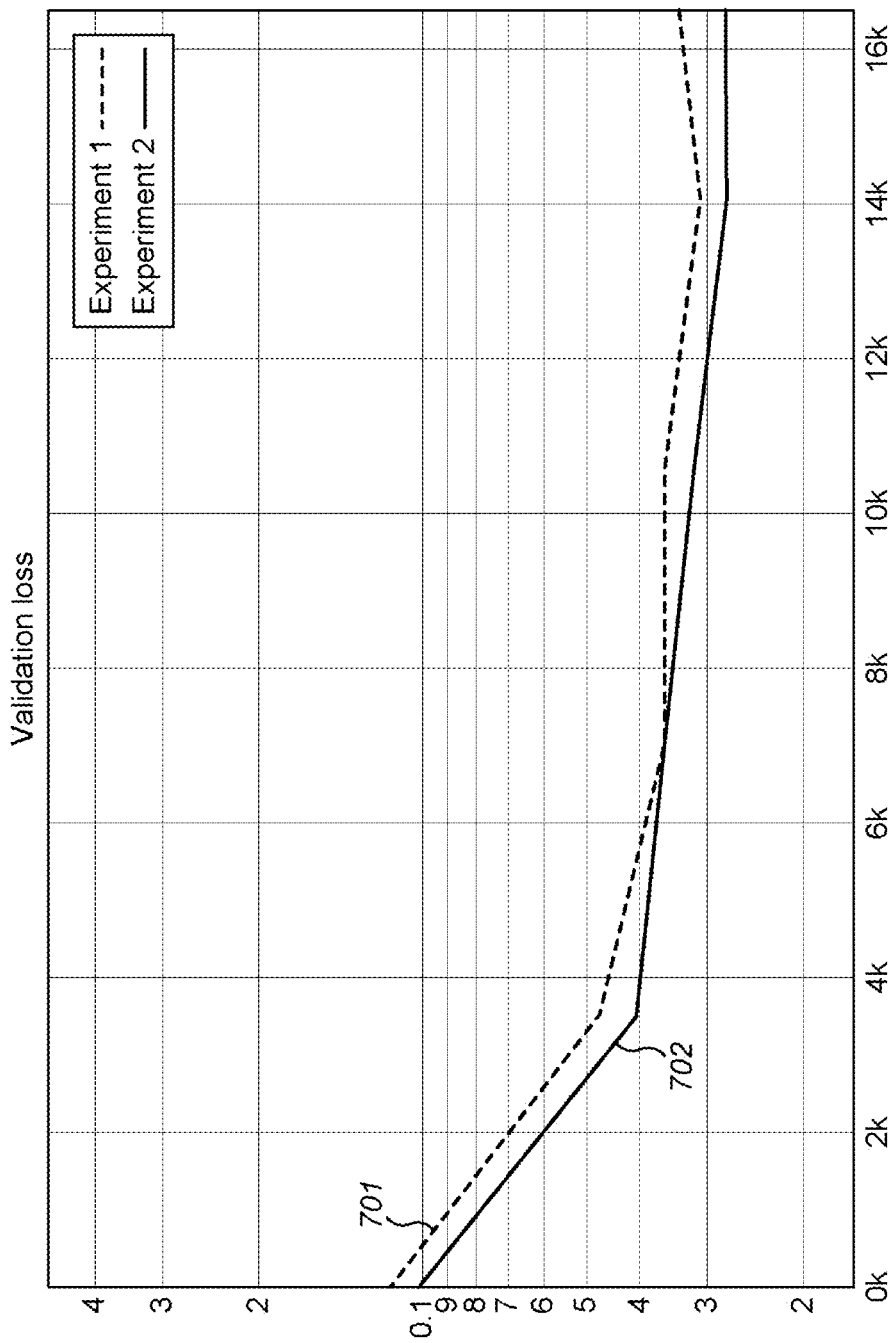
FIG. 7 shows the performance of a CNN in identifying water with incidence angle information compared to without.

FIG. 7 shows the performance of both experiments by plotting validation loss against time. Validation loss is a measure of how well the model can mimic the validation set. Trace 701 shows the validation loss for Experiment 1, where the validation images are provided to the model but not the incidence angle data associated with each image. Trace 702 shows the validation loss for Experiment 2, in which the model is provided with both the validation images and the associated incidence angle information. Experiment 2 shows that the CNN performs better when the incidence angle information is provided. It can be seen from trace 702 that it is approximately 10-20% better at all time steps, ending at a 25% advantage (0.028 vs 0.035) after the training ended. Training was ended when Experiment 1 hit an early stopping criterion because the training loss had plateaued.

Figure 8:
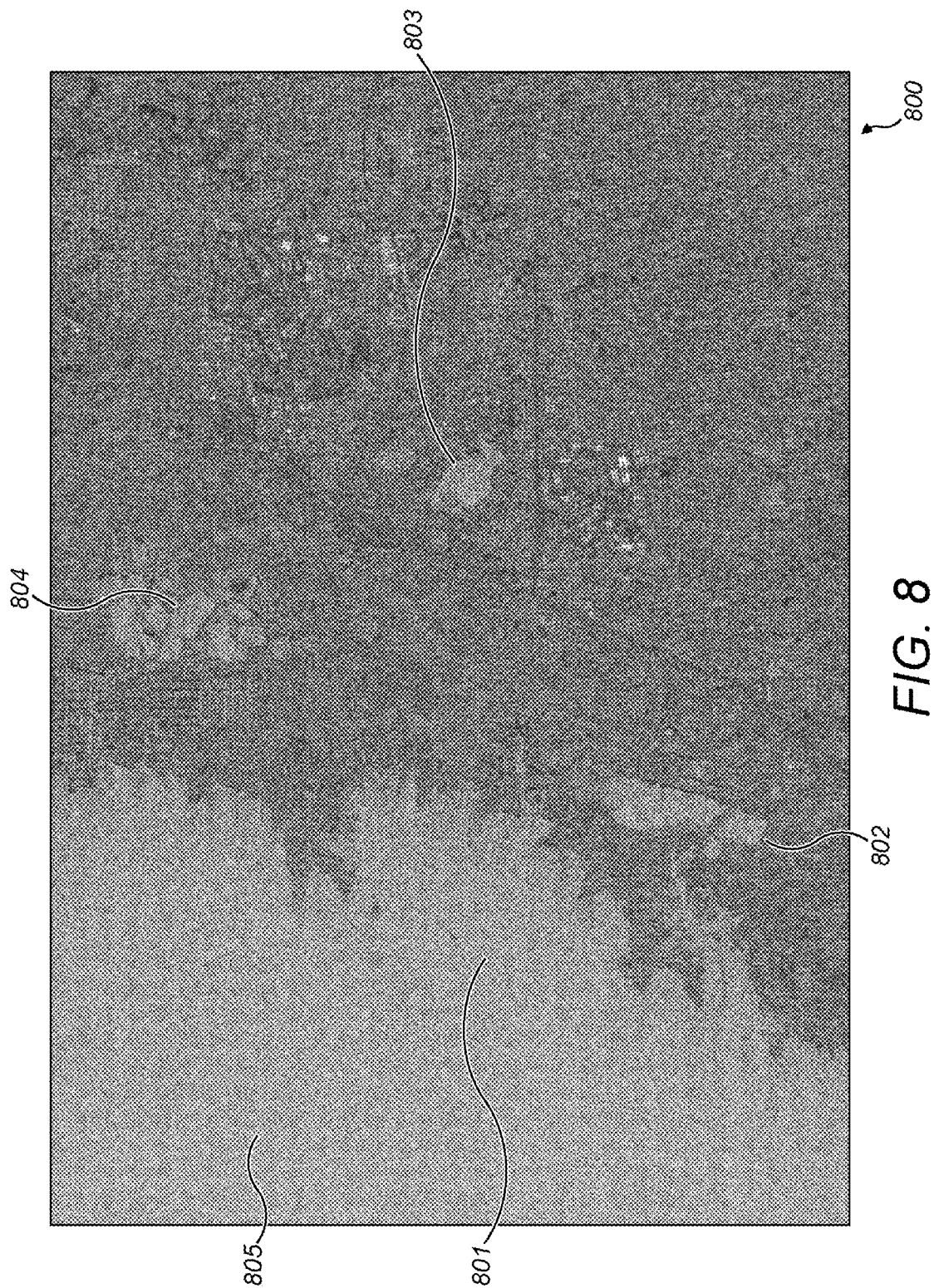
FIG. 8 shows an example SAR image with areas of water and areas of land.

FIG. 8 shows a SAR image 800 taken of a scene from the west coast of Florida around Lake Baywood. There are a number of water features in this image. The area indicated by 801 is the ocean near the shoreline. In addition to the ocean, there are a number of smaller lakes in the image, such as Lake Baywood 802, Hunters Lake 803, and a series of smaller lakes 804 shown in the upper centre of the image. Area 805 represents water further offshore. This image is taken with a relatively low centre incidence angle of approximately 16 degrees. In some example SAR images such as those obtained by ICEYE satellites, there can be a strong contrast inversion near this angle. For example, water typically appears dark when imaged from incidence angles of 20° or greater, unless the surface of the water is quite rough (e.g., if disturbed by wind and waves). However, for images taken from incidence angles less than 20° such as image 800 in FIG. 8, the water can appear relatively bright, as indicated by the lighter areas. This particular image was chosen to see if the model is able to parse this contrast change in order to correctly identify the areas that are covered with water despite the light colour.

Figure 9:
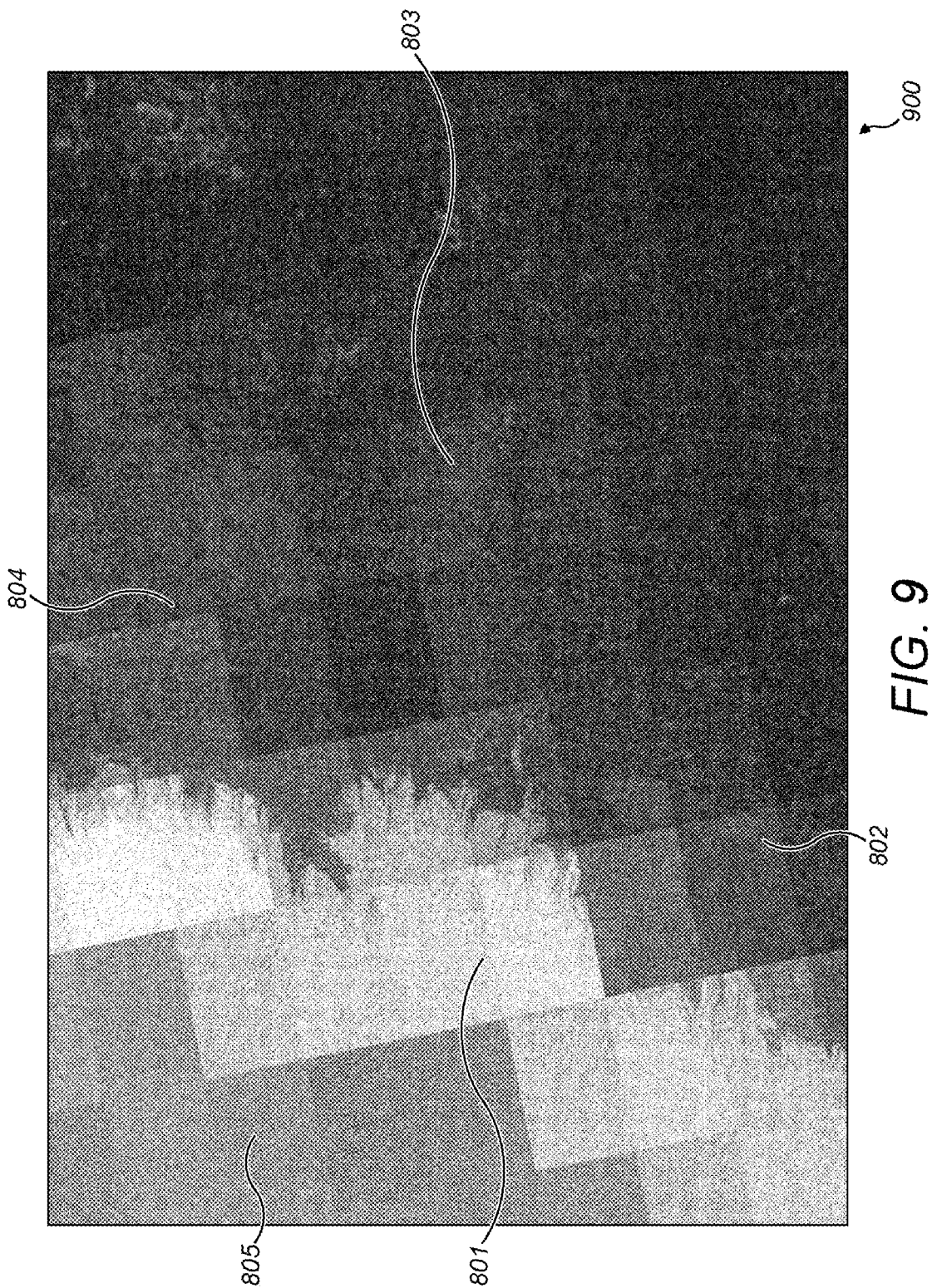
FIG. 9 shows the results of processing a SAR image without incidence angle information.

FIG. 9 shows an image 900 after being processed by a CNN that is presented with image 800 in FIG. 8 without any incidence angle data and asked to determine which areas are covered by water. Image 900 represents probabilities determined by the CNN of a particular pixel being water, where brighter white means a larger probability of classifying a pixel as water, and a darker area representing a lower probability of that area being water. In image 900, the CNN does a reasonably good job of identifying the near-shore area 801 as being water. However, Lake Baywood 802, Hunters Lake 803, and the smaller lakes 804 all appear to be quite dark, meaning that the probability of these areas being water as assigned by the CNN is still quite low.

Figure 10:
FIG. 10 shows the results of processing a SAR image with incidence angle information.

FIG. 10 shows an image 1000 also with the probabilities of a particular pixel and area being water, as generated by the same CNN, but this time with the benefit of knowing the incidence angle (~16°) from which image 800 was taken. Comparing FIG. 9 and FIG. 10, both models do a good job of identifying the near-shore ocean 801 as being water, with image 1000 perhaps showing a slightly higher probability (brighter white) of those areas being water than image 900. Both images 900 and 1000 seem to show similar issues with identifying the open water areas further offshore (e.g., area 805), possibility due to wind and wave disturbance of the waters further away from the coast. However, image 1000 shows that the CNN with the benefit of knowing the incidence angle is much better at identifying the smaller lakes that are inland of the coast. Whereas Lake Baywood 802, Hunters Lake 803, and the smaller lakes 804 are all quite dark in image 900, they appear quite bright in image 1000, indicating that the CNN has assigned a much higher probability of these lakes being water (which of course they are). Thus, by way of example it can be shown that a CNN that is trained with incidence angle data and provided with incidence angle data for a given image, while still not perfect, can do a significantly better job of segmenting out areas with a particular feature than a CNN that is not provided with the same incidence angle information.

The above description discusses embodiments of the invention with reference to a single user for clarity. It will be understood that in practice the system may be shared by a plurality of users, and possibly by a very large number of users simultaneously.

The embodiments described above may be fully automatic. In some examples, a user or operator of the system may manually instruct some steps of the method to be carried out.

In the described embodiments of the invention, the system may be implemented as any form of a computing and/or electronic device. Such a device may comprise one or more processors that may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and Blu-ray® disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fibre optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A computer-implemented method of classifying objects in an image of a surface of the Earth, the method comprising:
  receiving image data associated with the image from a spaceborne or airborne detector;
  receiving incidence angle data, wherein the incidence angle data is indicative of an incidence angle from which the image data is collected by the spaceborne or airborne detector;
  using a machine learning model to classify one or more objects within the image as belonging to one of one or more categories based on the incidence angle data and values of one or more parameters of the image data, wherein the machine learning model is trained on a training dataset generated from training images and associated incidence angles; and outputting the image showing classifications of one or more objects determined by the machine learning model, wherein the training dataset is formed by:
receiving image data associated with a plurality of training images generated by a spaceborne or airborne detector and associated incidence angle for each image;
generating a training data patch for each training image by:
augmenting the associated incidence angle data to generate angle range data, wherein the angle range data is indicative of a range of angles that the machine learning model is trained to recognise as being similar to the incidence angle indicated by the incidence angle data; and
concatenating the angle range data to the associated image data; and
compiling the training data patches to generate the training dataset.

2. The computer-implemented method according to claim 1, wherein generating a training data patch further comprises:
before concatenating, projecting the associated incidence angle data and/or the angle range data to a two dimensional patch having the same size as the associated image data.

3. The computer-implemented method according to claim 1, wherein the machine learning model is trained based, at least in part, on an elevation model of terrain imaged by the detector.

4. The computer-implemented method according to claim 1, wherein the incidence angle data is derived from a local incidence angle model based on a geometric model of the Earth and one or more state vectors indicative of the position of the detector relative to the geometric model of the Earth.

5. The computer-implemented method according to claim 4, wherein the geometric model of the Earth is an ellipsoidal model.

6. The computer-implemented method according to claim 4, wherein the local incidence angle model comprises a function defining a relationship between the incidence angle and a distance in a first direction within the image.

7. The computer-implemented method according to claim 6, wherein the function is a polynomial determined based on the geometric model of the Earth and a model of the trajectory of the spaceborne or airborne detector.

8. The computer-implemented method according to claim 1, wherein classifying the one or more objects within the image comprises classifying each of a plurality of pixels of the image as belonging to one of one or more categories.

9. The computer-implemented method according to claim 1, wherein classifying one or more objects within the image comprises classifying one or more objects within a section of the image.

10. The computer-implemented method according to claim 1, wherein the incidence angle data is received simultaneously with the image data.

11. The computer-implemented method according to claim 1, wherein the spaceborne or airborne detector is on-board a satellite in orbit around the Earth.

12. The computer-implemented method according to claim 11, wherein:
the incidence angle data is derived from a local incidence angle model based on a geometric model of the Earth and one or more state vectors indicative of the position of the detector relative to the geometric model of the Earth; and
the one or more state vectors indicative of the position of the detector are based on a model of the orbital path of the satellite.

13. The computer-implemented method according to claim 1, wherein the one or more parameters of the image data include one or more of:
intensity values for each of a plurality of pixels;
colour channel values for each of a plurality of pixels;
phase information for each of a plurality of pixels; or
any combination of them.

14. The computer-implemented method according to claim 1, wherein the image is a synthetic-aperture radar image.

15. The computer-implemented method according to claim 1, wherein the one or more categories include one or more geographical features.

16. The computer-implemented method according to claim 15, wherein the one or more geographical features include one or more of:
ice;
arable land;
forested land;
man-made constructions, or
any combination of them.

17. The computer-implemented method according to claim 1, wherein the machine learning model comprises an artificial neural network.

18. The computer-implemented method according to claim 17, wherein the artificial neural network is a convolutional neural network.

19. The computer-implemented method of claim 1, further comprising training the machine learning model using the training dataset.

20. A computer apparatus comprising a processor configured to carry out a computer-implemented method of classifying objects in an image of a surface of the Earth, the method comprising:
receiving image data associated with the image from a spaceborne or airborne detector;
receiving incidence angle data, wherein the incidence angle data is indicative of an incidence angle from which the image data is collected by the spaceborne or airborne detector; and
using a machine learning model to classify one or more objects within the image as belonging to one of one or more categories, based on the incidence angle data and values of one or more parameters of the image data, wherein the machine learning model is trained on a training dataset generated from training images and associated incidence angles; and
wherein the training dataset is formed by:
receiving image data associated with a plurality of training images generated by a spaceborne or airborne detector and associated incidence angle for each image;
generating a training data patch for each training image by:
augmenting the associated incidence angle data to generate angle range data, wherein the angle range data is indicative of a range of angles that the machine learning model is trained to recognise as being similar to the incidence angle indicated by the incidence angle data; and concatenating the angle range data to the associated image data; and compiling the training data patches to generate the training dataset.

21. A non-transitory computer readable storage medium having computer executable instructions stored thereon which, when executed by a computer, cause the computer to carry out a computer-implemented method of classifying objects in an image of a surface of the Earth, the method comprising:

receiving image data associated with the image from a spaceborne or airborne detector;

receiving incidence angle data, wherein the incidence angle data is indicative of an incidence angle from which the image data is collected by the spaceborne or airborne detector; and using a machine learning model to classify one or more objects within the image as belonging to one of one or more categories, based on the incidence angle data and values of one or more parameters of the image data, wherein the machine learning model is trained on a training dataset generated from training images and associated incidence angles; and wherein the training dataset is formed by:

receiving image data associated with a plurality of training images generated by a spaceborne or airborne detector and associated incidence angle for each image;

generating a training data patch for each training image by:

augmenting the associated incidence angle data to generate angle range data, wherein the angle range data is indicative of a range of angles that the machine learning model is trained to recognise as being similar to the incidence angle indicated by the incidence angle data; and concatenating the angle range data to the associated image data; and compiling the training data patches to generate the training dataset.

* * * * *